United States Patent
Shaw et al.

(10) Patent No.: US 9,760,936 B1
(45) Date of Patent: Sep. 12, 2017

(54) METHOD OF AND SYSTEM FOR PURCHASING AN ITEM USING CONTRIBUTIONS FROM MULTIPLE PEOPLE

(76) Inventors: Kenneth Shaw, Seattle, WA (US); Kavin Asavanant, Suanhuang Bangkok (TH)

(*) Notice: Subject to any disclaimer, the term of this patent is extended or adjusted under 35 U.S.C. 154(b) by 1353 days.

(21) Appl. No.: 12/004,304

(22) Filed: Dec. 19, 2007

(51) Int. Cl.
G06Q 30/00 (2012.01)
G06Q 30/06 (2012.01)
G06Q 30/02 (2012.01)

(52) U.S. Cl.
CPC ..... *G06Q 30/0633* (2013.01); *G06Q 30/0279* (2013.01); *G06Q 30/0631* (2013.01)

(58) Field of Classification Search
CPC ............ G06Q 30/0633; G06Q 30/0613
USPC ................... 705/26, 27, 26.1, 27.1
See application file for complete search history.

(56) References Cited

U.S. PATENT DOCUMENTS

| | | | |
|---|---|---|---|
| 5,663,547 A | 9/1997 | Ziarno | 235/380 |
| 5,665,952 A | 9/1997 | Ziarno | 235/380 |
| 5,696,366 A | 12/1997 | Ziarno | 235/380 |
| 5,960,411 A | 9/1999 | Hartman et al. | 705/26 |
| 7,013,292 B1 | 3/2006 | Hsu et al. | 705/37 |
| 7,792,699 B2 * | 9/2010 | Kwei | G06Q 30/06 705/26.4 |
| 2001/0034668 A1 * | 10/2001 | Whitworth | G06Q 30/06 705/26.3 |
| 2004/0148228 A1 * | 7/2004 | Kwei | G06Q 30/06 705/26.4 |
| 2006/0122926 A1 | 6/2006 | Hsu et al. | 705/35 |
| 2006/0161484 A1 * | 7/2006 | Pandhe | 705/27 |
| 2007/0124215 A1 * | 5/2007 | Simmons | G06Q 30/0603 705/27.2 |
| 2008/0189189 A1 * | 8/2008 | Morgenstern | 705/26 |
| 2008/0243684 A1 * | 10/2008 | Ng | G06Q 20/10 705/39 |
| 2008/0301005 A1 * | 12/2008 | Nieda et al. | 705/27 |
| 2009/0061901 A1 * | 3/2009 | Arrasvuori | G06Q 30/00 455/456.3 |

OTHER PUBLICATIONS

Needleman, Rafe: "Homeslyce: Standford's Birthday Club," Internet Archive Wayback Machine; /homeslyce.com/webware.com; Nov. 15, 206; 2 pges.*
Park, Joyce: "I will teach you to be Rich: Friday Entrepreneurs Archives," Internet Archive Wayback Machine; homeslyce.com/ iwillteachyoutoberich.com; Dec. 1, 2006; pp. 4-8; 46 total pages.*

(Continued)

*Primary Examiner* — Rob Pond
(74) *Attorney, Agent, or Firm* — Haverstock & Owens LLP

(57) ABSTRACT

A method of and system for purchasing an item using contributions from multiple people enables multiple users to contribute towards a gift. Typically the gift is one that each user would not purchase individually, but as a group, each user is able to contribute a portion of the total payment. Preferably, a gift host selects the gift, provides desired information and invited contributors are informed of the gift by email. The invited contributors then provide the necessary information to contribute before a deadline is reached. If the contributions are enough to purchase the gift, the gift is purchased and is given to a gift receiver.

16 Claims, 15 Drawing Sheets

(56) References Cited

OTHER PUBLICATIONS

Internet Archive Wayback Machine; homeslyce.com; Dec. 14, 2006; 2pgs.*

Felicite.com, Inc., "Felicite. Com Awarded Patent for Gift Registery with Partial Purchase Feature", Mar. 23, 2006, http://www.felicite.com/presskit/patent.htm.

PayPal, "Group Gift-Giving Make it Easy, With Paypal", Copyright 1999-2008, http://www.paypal.com/cgi-bin/webscr?cmd=xpt/cps/general/MayEmailNL-outside.

* cited by examiner

600

Happy Birthday!

🎂 You've been sliced!

Your friends all pitched in to buy you a great gift for your birthday. We've shipped it, so be expecting your gift in the mail! The gift was shipped to:

234 Oak Street
Palo Alto, CA 23421

The following friends contributed to your gift: Mickey Asavanant, Kenneth Shaw, Jennifer Gee (top contributors); and Will Miraglia, Mitchel Daniel, Megan Fox, Stephanie Wu

Birthday Wishes!

Hey Andrew, Happy Birthday! - Will

Thanks for being an awesome brother! Happy Birthday! - Kenneth

Happy Birthday Andrew! - Mickey

Hope you like the gift! - Jen

You ROCK Andrew! - Mitchel brought to you by H🍕meslyce.com Slice a gift with your friends This email was sent to you from the Homeslyce wesbite. Contact customer service to report abuse issues.

H🍕meslyce
Slice a gift with your friends

Fig. 6

METHOD OF AND SYSTEM FOR PURCHASING AN ITEM USING CONTRIBUTIONS FROM MULTIPLE PEOPLE

FIELD OF THE INVENTION

The present invention relates to the field of commerce. More specifically, the present invention relates to the field of electronic commerce where multiple people contribute to purchase an item.

BACKGROUND OF THE INVENTION

Many products that are popular gift items usually cost in the $200-$700 range such as iPods, game consoles, digital cameras and so on. However, most people prefer to spend between $50-$100 for a gift. Therefore, there is a gap between what people are willing to spend and the cost of the most popular gift ideas. One of two things usually take place. Either the gift giver spends more than he wants and buys the popular gift, thus annoying the gift giver due to the lack of funds for more important items for himself. Or the gift giver buys a cheaper gift which is in his price range. This second route causes a number of issues. The gift is likely something that the gift receiver did not want, which in turn causes the gift receiver to be less than satisfied with the gift. This then results in the gift being exchanged which is a waste of time for the gift receiver. Another result is the simple lack of use or re-gifting of the unwanted gift. Over 57% of Americans have received gifts that they do not want according to the eBay Press. Therefore, the difference between the cost of desired gifts and the amount people are willing to spend is a significant problem.

To overcome the disparity between gift amounts people are willing to spend and the cost of popular gifts, people have combined efforts to purchase a single item. For example, friends who wanted to buy a birthday gift for another friend would usually pick someone to collect all of the money from each friend and then buy the gift using the collected money. Using this method, a group of six friends who each spend $50 are able to buy a $300 digital camera rather than six individual undesirable gifts. While this method enables a group of people to buy a more expensive gift, it has several drawbacks. If a person forgets to pay or changes his mind, someone, usually the person doing the collecting, has to contribute additional funds or otherwise all of the time and effort would be wasted. If friends are located in different parts of campus, different towns, across the country or even across the world, it can be very difficult to collect money from everyone and deliver the gift. Social awkwardness arises if people do not pay immediately and the collector must keep reminding him to pay. Also, it is difficult to divide up the costs as well as for contributors to have the right change. Therefore, manually collecting money and reminding people to contribute to a gift is not a very efficient solution.

When people register for gift registries such as wedding and baby registries, depending on the gifts available, gift buyers buy items that fit in their price range, and if nothing fits in their price range they deviate from the registry and purchase a likely unwanted gift. To combat this problem with gift registries, U.S. Pat. No. 7,013,292 ('292) to Hsu et al. with a corresponding website, felicite.com, teaches a partial purchase feature for gift registries which allows gift givers to make a partial contribution towards any gift in the registry. When the contributions add up to the cost of the item, it is purchased. However, the '292 patent is lacking in a number of areas; specifically, that it must be used in conjunction with a registry system.

Other websites also aggregate money, such as chipin.com, fundable.com and paypal.com, but each has areas that would benefit from improvements.

SUMMARY OF THE INVENTION

A method of and system for purchasing an item using contributions from multiple people enables multiple users to contribute towards a gift. Typically the gift is one that each user would not purchase individually, but as a group, each user is able to contribute a portion of the total payment. Preferably, a gift host selects the gift, provides desired information and invited contributors are informed of the gift by email. The invited contributors then provide the necessary information to contribute before a deadline is reached. If the contributions are enough to purchase the gift, the gift is purchased and is given to a gift receiver.

In one aspect, a method of enabling a plurality of people who have a relationship, where the relationship includes mutually purchasing items for each other, to contribute using a computing device to purchase an item, comprises receiving an item selection, receiving contributions towards the purchase of the item and executing the purchase of the item. The method further comprises receiving information about an item receiver. The information about the item receiver includes the item receiver's birthday information. The method further comprises delivering the item to the item receiver on a date based on the item receiver's birthday information. The method further comprises receiving information about the plurality of people who send the contributions towards the purchase of the item. The information about the plurality of people includes a birthday of each person. Receiving the item selection is without any input from an item receiver. The method further comprises providing a list of recommended items wherein a searching component generates the list of recommended items. The list of recommended items is generated from data found on a website. The website is a social networking website. The method further comprises a list of recommended items generated from data provided by at least one of the plurality of people. The method further comprises a list of recommended items generated by an item receiver. The method further comprises providing a virtual item list wherein the virtual item list includes a first image with additional images of desired items. The relationship is selected from the group consisting of family, friends and co-workers. The computing device is selected from the group consisting of a personal computer, a laptop computer, a computer workstation, a server, a mainframe computer, a handheld computer, a personal digital assistant, a cellular/mobile telephone, a smart appliance and a gaming console.

In another aspect, a method of purchasing a gift using a computing device without receiving any input from a gift receiver, where the gift is purchased by a plurality of people, comprises selecting the gift, sending contributions from the plurality of people, purchasing the gift if the contributions are at least equal to a price of the gift by a deadline, purchasing a gift card if the contributions are less than the price of the gift and a gift card option is selected and purchasing nothing if the contributions are less than the price of the gift and the gift card option is not selected. The contributions from the plurality of people are individually sent. The method further comprises providing information about a gift receiver. The information about the gift receiver includes the gift receiver's birthday information. The method further comprises receiving the gift on a date based on the gift receiver's birthday information. The method further comprises providing information about the plurality of people who send the contributions towards the purchase of the gift. The information about the plurality of people includes a birthday of each person. The method further comprises viewing a list of recommended gifts wherein a searching component generates the list of recommended gifts. The list of recommended gifts is generated from data found on a website. The method further comprises viewing a list of recommended gifts generated from data provided by at least one of the plurality of people. The plurality of people have a relationship, wherein the relationship includes mutually purchasing items for each other. The relationship is selected from the group consisting of family, friends and co-workers. The computing device is selected from the group consisting of a personal computer, a laptop computer, a computer workstation, a server, a mainframe computer, a handheld computer, a personal digital assistant, a cellular/mobile telephone, a smart appliance and a gaming console.

In another aspect, a system for utilizing a computing device for facilitating purchasing an item by a plurality of people, comprises a first web page for displaying the item, a selecting component available on the first web page, the selecting component for selecting the item to be purchased by the plurality of people without adding the item to a registry and a second web page, the second web page operably coupled to the selecting component, the second web page for enabling the plurality of people to contribute to purchase the item. The first web page is incorporated within a first website and the second web page is incorporated within a second website. The second web page enables receiving information about a gift receiver. The information about the gift receiver includes the gift receiver's birthday information. The gift is delivered to the gift receiver on a date based on the gift receiver's birthday information. The second web page enables receiving information about the plurality of people who send the contributions towards the purchase of the gift. The information about the plurality of people includes a birthday of each person. The first web page includes a list of recommended gifts wherein a searching component generates the list of recommended gifts. The list of recommended gifts is generated from data found on a website. The first web page includes a list of recommended gifts is generated from data provided by at least one of the plurality of people. The plurality of people have a relationship, wherein the relationship includes mutually purchasing items for each other. The relationship is selected from the group consisting of family, friends and co-workers. The computing device is selected from the group consisting of a personal computer, a laptop computer, a computer workstation, a server, a mainframe computer, a handheld computer, a personal digital assistant, a cellular/mobile telephone, a smart appliance and a gaming console.

In another aspect, a system for displaying information related to individual contributions for a gift on a desktop of a computing device comprises a processor and an application processed by the processor for displaying contribution information on the desktop. Really Simple Syndication feeds are implemented to display current contribution information. The contribution information includes a gift title, a gift receiver name and an amount of money contributed. The contribution information is related to multiple gifts. An interface of the application appears on less than 1/4 of the desktop. The computing device is selected from the group consisting of a personal computer, a laptop computer, a computer workstation, a server, a mainframe computer, a handheld computer, a personal digital assistant, a cellular/mobile telephone, a smart appliance and a gaming console.

In another aspect, a method of encouraging repeating purchases of gifts by a plurality of people for people within the plurality of people, the plurality of people individually contribute to each gift, comprises storing on a computing device event information related to each person within the plurality of people and sending a reminder related to the event information to at least some of the people within the plurality of people. The event information is related to an event further wherein the event is selected from the group consisting of a birthday, an anniversary and a holiday. The reminder is selected from the group consisting of an email, a text message and a voice message. At least some of the people includes all of the people except the person whose event is upcoming. At least some of the people includes all of the people. The reminder is sent a period of time before the event. The computing device is selected from the group consisting of a personal computer, a laptop computer, a computer workstation, a server, a mainframe computer, a handheld computer, a personal digital assistant, a cellular/mobile telephone, a smart appliance and a gaming console.

In yet another aspect, a system for encouraging repeating purchases of gifts by a plurality of people for people within the plurality of people, comprises a computing device for storing event information related to each person within the plurality of people and an application stored on the computing device for sending a reminder related to the event information to at least some of the people within the plurality of people. The event information is related to an event further wherein the event is selected from the group consisting of a birthday, an anniversary and a holiday. The reminder is selected from the group consisting of an email, a text message and a voice message. At least some of the people includes all of the people except the person whose event is upcoming. At least some of the people includes all of the people. The reminder is sent a period of time before the event. The computing device is selected from the group consisting of a personal computer, a laptop computer, a computer workstation, a server, a mainframe computer, a handheld computer, a personal digital assistant, a cellular/mobile telephone, a smart appliance and a gaming console.

BRIEF DESCRIPTION OF THE DRAWINGS

FIG. 6 illustrates a graphical representation of an exemplary gift email.

DETAILED DESCRIPTION OF THE PREFERRED EMBODIMENT

A method of and system for purchasing an item using contributions from multiple people is described herein. In some embodiments, a gift host of the multiple people chooses a gift for an individual (e.g. gift receiver) and notifies possible contributors of the gift. Preferably, the possible contributors are friends or relatives of the individual. In some embodiments, the possible contributors are co-workers or another group of individuals. Preferably, the possible contributors are notified via email, although any means of notification is permitted. For example, using Voice over Internet Protocol (VoIP), the gift host is able to record a message and then transmit that message to the possible contributors who receive the message on their phones. Preferably, the notification includes an invitation to contribute to the gift. After the contributors make their contributions to the gift, the gift is purchased and sent to the desired location such as the gift receiver's house. In some embodiments, if the total contribution is not met, the gift is canceled and no one is charged anything. In some embodiments, if an option is selected to convert unmet contributions to a gift card, then the contributions are converted into a gift card. In some embodiments, if an option is selected to convert unmet contributions to a less expensive gift, then the contributions are converted into a less expensive gift. Payment is preferably made by credit card or an online payment system although any payment method is possible.

FIGS. 1-7 illustrate an exemplary website for slicing a gift.

Figure 1:
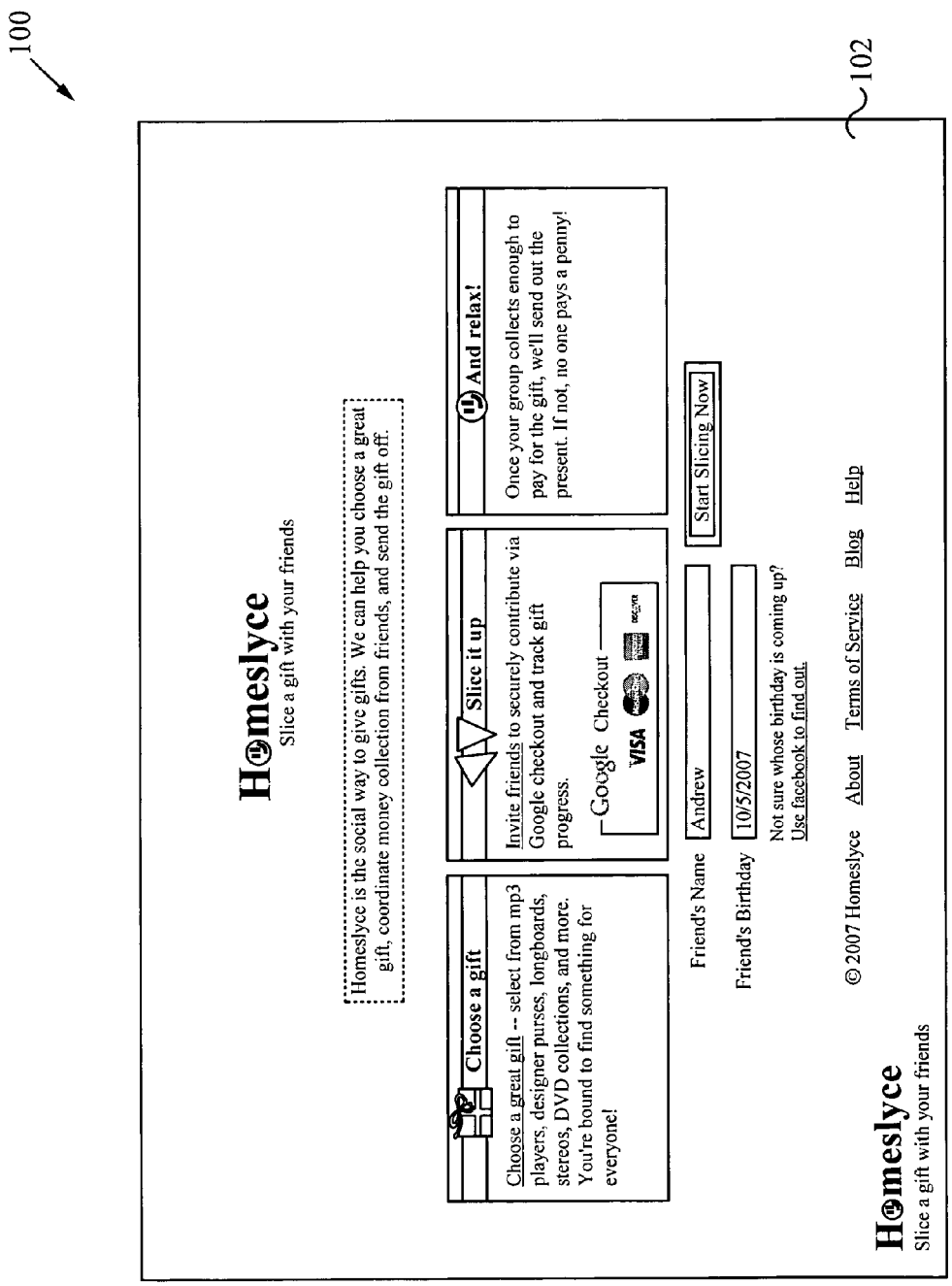
FIG. 1 illustrates a graphical representation of an exemplary introductory web page for a website to enable multiple contribution purchases.

FIG. 1 illustrates a graphical representation of an exemplary introductory web page 100 for a website to enable multiple contribution purchases. Preferably, the introductory web page 100 provides introductory input components 102 such as text boxes and a command button to receive a gift receiver's name and birthday to begin the process of slicing the gift's cost. Preferably, the gift host enters the gift receiver's information. After inputting the requested data such as the gift receiver's name and birthday, the gift host is directed to a shopping page. In some embodiments, the birthday information is eventually sent to the company that ships the gift, so that they are able to ensure the gift arrives on or before the gift receiver's birthday. In some embodiments, additional information is able to be entered as well, such as an address, an email address, as well as other data. Moreover, some of or all of the information intended to be entered on the introductory web page 100 is able to be entered on a different page if the introductory web page 100 does not exist or if a secondary page is used to receive additional information.

Figure 2:
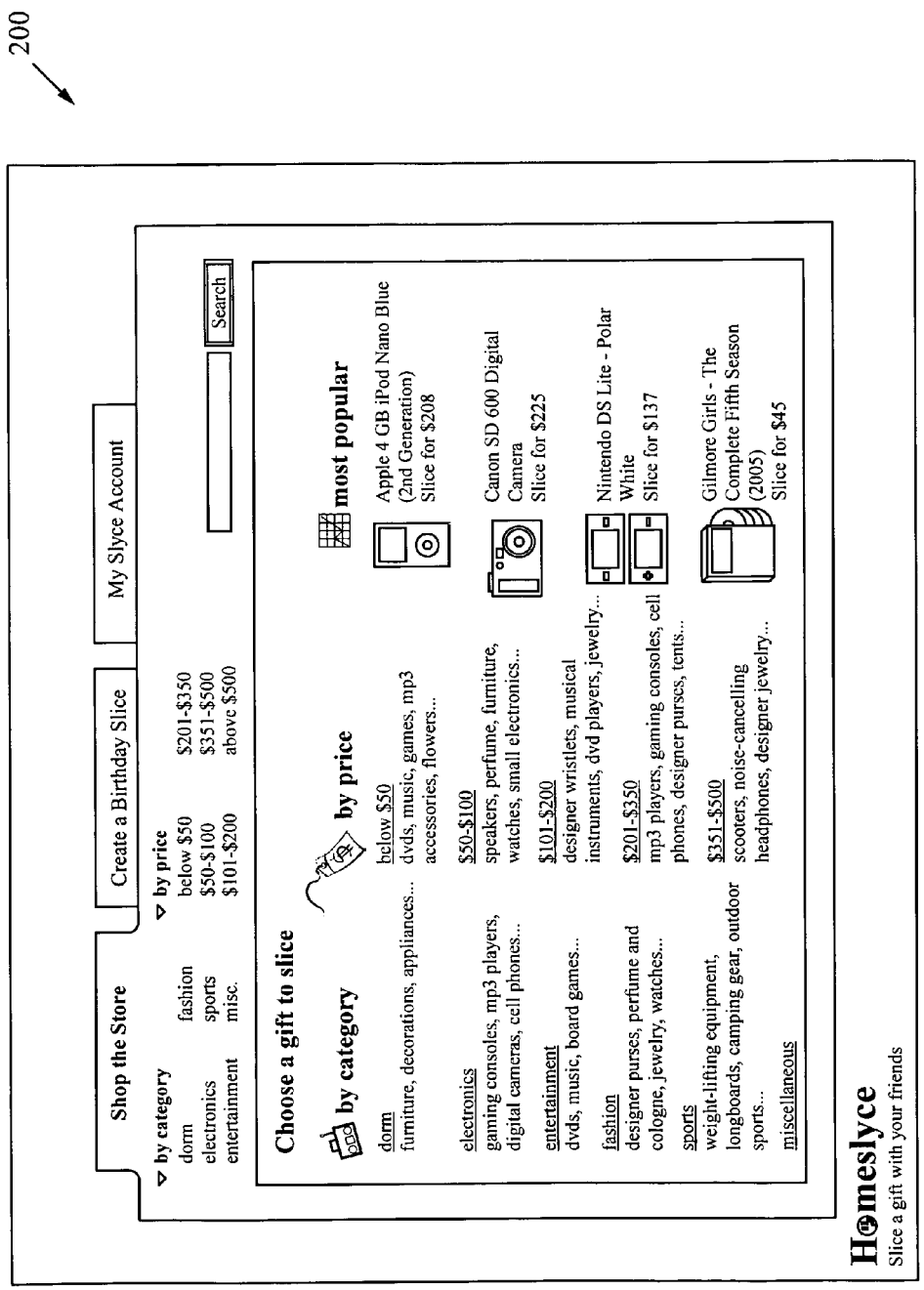
FIG. 2 illustrates a graphical representation of an exemplary shopping page.

FIG. 2 illustrates a graphical representation of an exemplary shopping page 200. The shopping page 200 is able to be configured in any manner, as there are a plethora of different ways of displaying products for sale on the Internet. As shown in the exemplary shopping page 200, one column sorts products by category, another column sorts products by price and a third column includes the most popular products. In some embodiments, the catalog of products listed is based on the gift receiver's preferences. In some embodiments, after selecting a product, additional information is displayed such as user reviews, images, specifications and other information that is found when shopping online for products.

In some embodiments, an additional column or a separate page includes recommended gifts. The recommended gifts are able to be determined based on the gift receiver's characteristics such as age, occupation, likes/dislikes and other factors that are entered in by the gift receiver, the gift host or other contributors. The recommended gifts are also able to be determined using a system which browses through the gift receiver's profile on social networking sites such as myspace.com and facebook.com, and then based on his/her activities, interests, favorite movies, music, television shows, books and other details found there, the system is able to suggest gifts. Questionnaires are also able to be given to a gift receiver's friends, family, co-workers or others such as geek/sporty, GPA above 3.5 or not, poker fan or not and others to determine what gifts are appropriate. Additional information is able to be included such as data from Amazon.com's existing engine based on past history and clicks.

In some embodiments, a wish list, preferably a virtual wish list, is also displayed for the gift host to select a gift from. The wish list includes items selected by the gift receiver that he would like to receive. The virtual wish list is described further below.

The shopping page 200 also includes a search component which is able to search the present site as well as other underlying sites such as Amazon.com®.

After the gift host selects a gift or gifts to purchase, the gift host is directed to a slice generation page.

Figure 3:
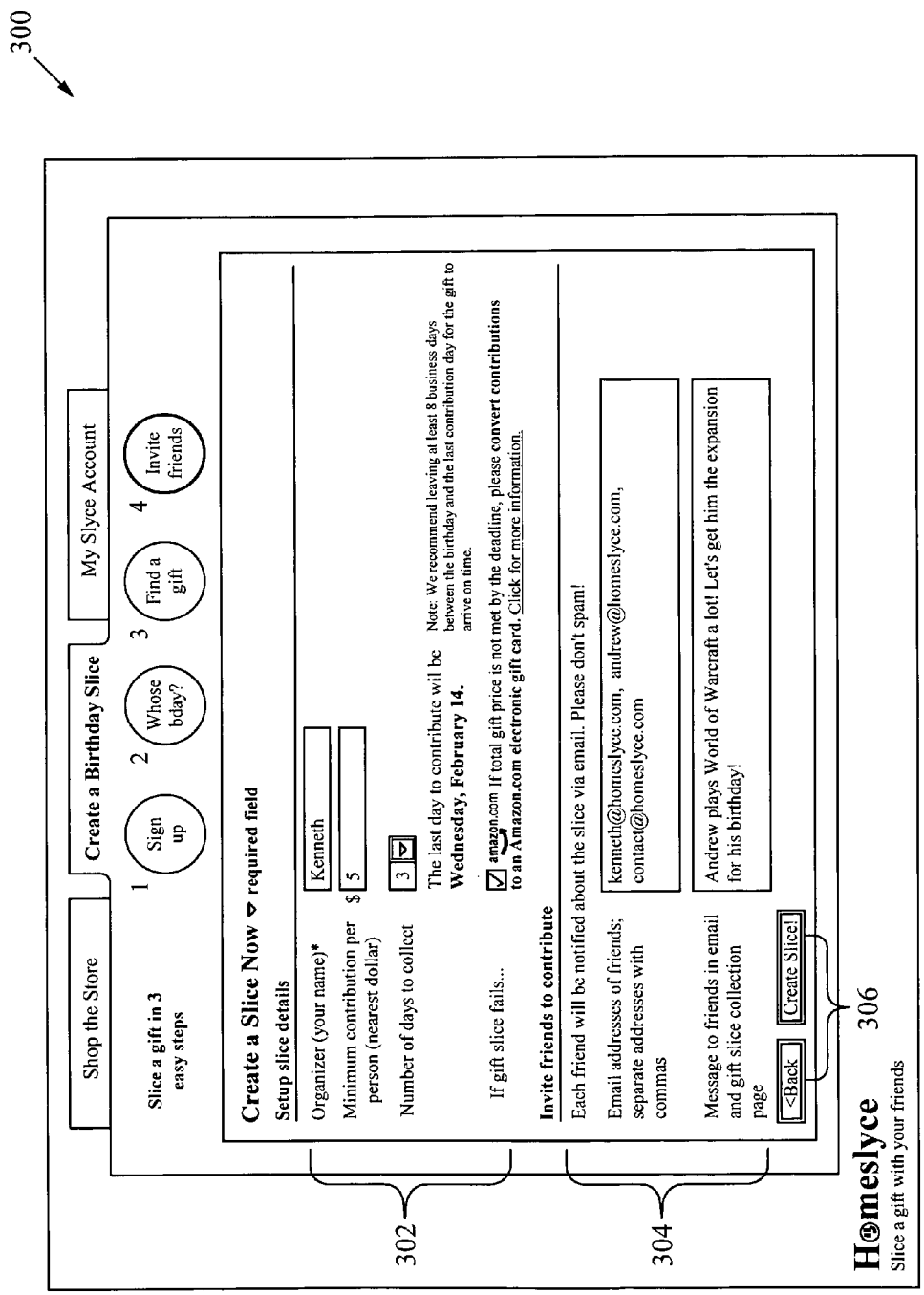
FIG. 3 illustrates a graphical representation of an exemplary slice generation page.

FIG. 3 illustrates a graphical representation of an exemplary slice generation page 300. To generate a slice, the gift host enters slice detail information in slice detail setup input components 302. For example, requested inputs are able to be an organizer's (gift host's) name, a minimum contribution per person, number of days to contribute and whether to provide a gift card and where the gift card is to be from if the slice fails. As shown in FIG. 3, the gift host's name is entered in a text box, as is the minimum contribution, while the number of days to contribute is a drop-down menu and the gift card option is a check box. The setup input components 302 are able to be other input components. For example, instead of a text box for the minimum contribution, a drop-down menu is able to be used; the number of days to collect is able to be a text box and the gift card option is able to be a drop-down menu. Any appropriate input component, so that the requested information is able to be received, is considered possible. More or less setup input components 302 are able to be included as well. For example, a maximum contribution per person input is also able to be included. Additionally, in some embodiments, the gift host is able to select from a number of stores/e-tailers where the gift card will be usable. Invitation input components 304 enable the gift host to input who will be invited to contribute to the sliced gift as well as send a message to the invited contributors. For example, in one text area, the gift host enters email addresses, preferably each separated by a comma or semicolon, of all of the people invited to contribute to the sliced gift. In a second text area, a user-generated message is able to be included in the email to the invited contributors. As described above, the invitation input components 304 are able to be input components other than text areas. For example, a drop-down menu of friends stored in an internal database or linked to an external database is able to display a list of friends and their email address to send the invitation to. A set of navigational command buttons 306 enable the gift host to generate the slice or return to the previous page. Fewer or additional navigational buttons are able to be included as well, such as a clear page button. After generating the slice, an email is sent to the invited contributors.

Figure 4:
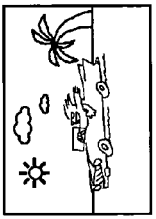
FIG. 4 illustrates a graphical representation of an exemplary invitation email automatically sent to invited contributors.

FIG. 4 illustrates a graphical representation of an exemplary invitation email 400 automatically sent to invited contributors. The invitation email 400 contains text entered by the gift host, possibly a picture and/or description of the gift and a contribute now component 402 such as a command button which opens a contribution web page in a browser window to receive contribution information. The invitation email 400 is able to be html-based or text-only for email programs block non-text data. In some embodiments, such as for text-only emails, the contribute command button is a link instead of a button.

Figure 5:
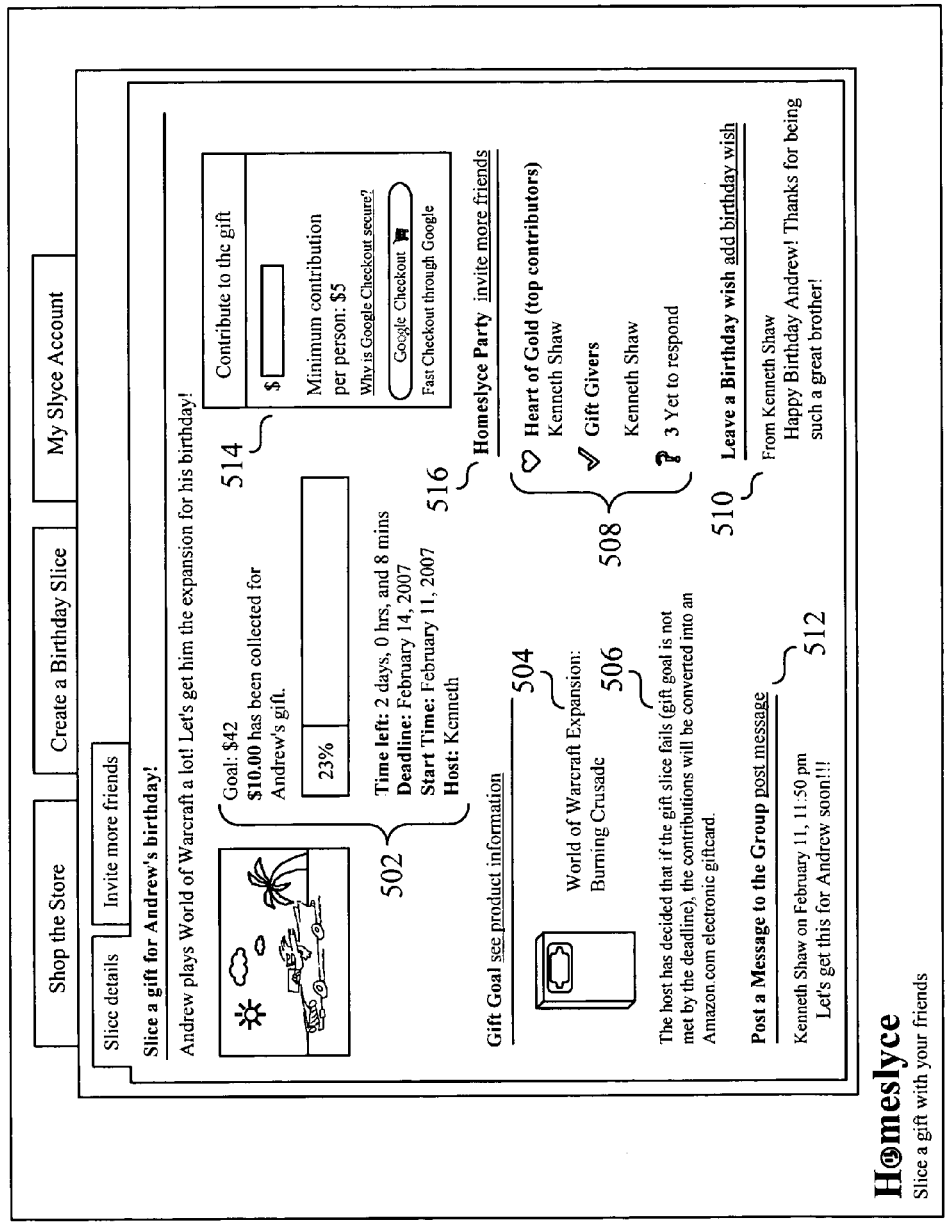
FIG. 5 illustrates a graphical representation of an exemplary contribution page.

FIG. 5 illustrates a graphical representation of an exemplary contribution page 500. A set of progress information 502 is displayed related to the status/progress of the gift slicing. For example, the goal amount, the amount of money collected, the percent of the money of the gift collected, the time left, the deadline, the start time and the host name are included in the set of progress information 502. More or less data is able to be displayed in the set of progress information 502. A gift 504 is displayed including, for example, an image of the gift and a text description. A gift card option 506 is displayed indicating whether or not a gift card will be given if the goal is not met. Contribution information 508 is displayed. The contribution information 508 includes, but is not limited to, a list of top contributors, a list of gift givers, a number indicating how many people are yet to respond and a list of those people yet to respond. In some embodiments, more or less information is included in the contribution information 508. The contribution information 508 provides social pressure to contribute as other contributors will know who did not contribute yet. After a contributor posts a birthday wish/personal message, personal message information 510 is displayed for other contributors. Contributors are also able to post a message to the group, so that group messages 512 are displayed. A contribute component 514 allows contributors to easily contribute to the sliced gift. The contribute component 514 is able to be any money collection system such as Google Checkout® or PayPal®. In some embodiments, an invitation component 516 such as a link to an invitation configuration page enables the gift host and/or contributors to invite additional people to contribute to the gift. In some embodiments, the invitation component is only available to the gift host. By including the invitation component 516, additional contributors beyond those initially invited are able to contribute. In some embodiments, a vote is able to be held to determine if additional people should be invited. In some embodiments, a vote is able to be held to determine if a specific person should be invited.

FIG. 6 illustrates a graphical representation of an exemplary gift email 600. The gift email 600 preferably displays information including, but not limited to, the gift receiver's address, the contributors' names and the personal message information 510 to the gift receiver from the contributors. In some embodiments more, less and/or different information is included in the gift email 600. For example, if the gift contributors wanted to make the gift anonymous, in some embodiments, they are able to select to not display their names. In some embodiments, the gift email is optional, so that people do not give away a surprise.

Figure 7:
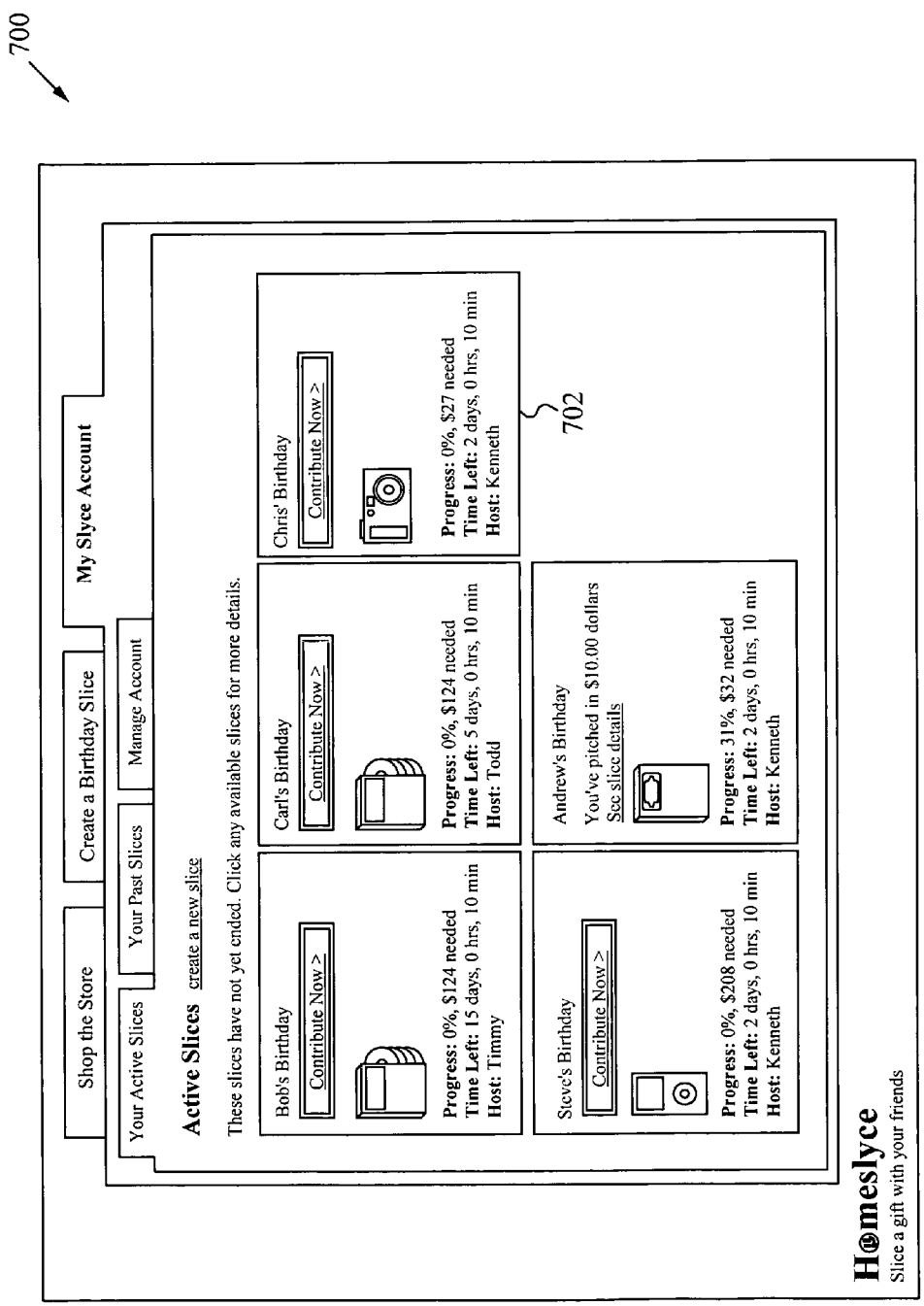
FIG. 7 illustrates a graphical representation of an exemplary account page with an active slice tab selected.

FIG. 7 illustrates a graphical representation of an exemplary account page with an active slice tab 700 selected. Within the active slice tab 700, a user is able to navigate to the "generate a new slice" web page. The user is also able to view active slice summaries 702. Preferably, within each active slice summary 702 is a contribute component, an image of the gift, progress information, time left and host information. In some embodiments, more or less information is included. In addition to the active slice tab 700, preferably there is a past slice tab and a manage account tab for viewing past slices and managing the user's account, respectively.

Figure 8:
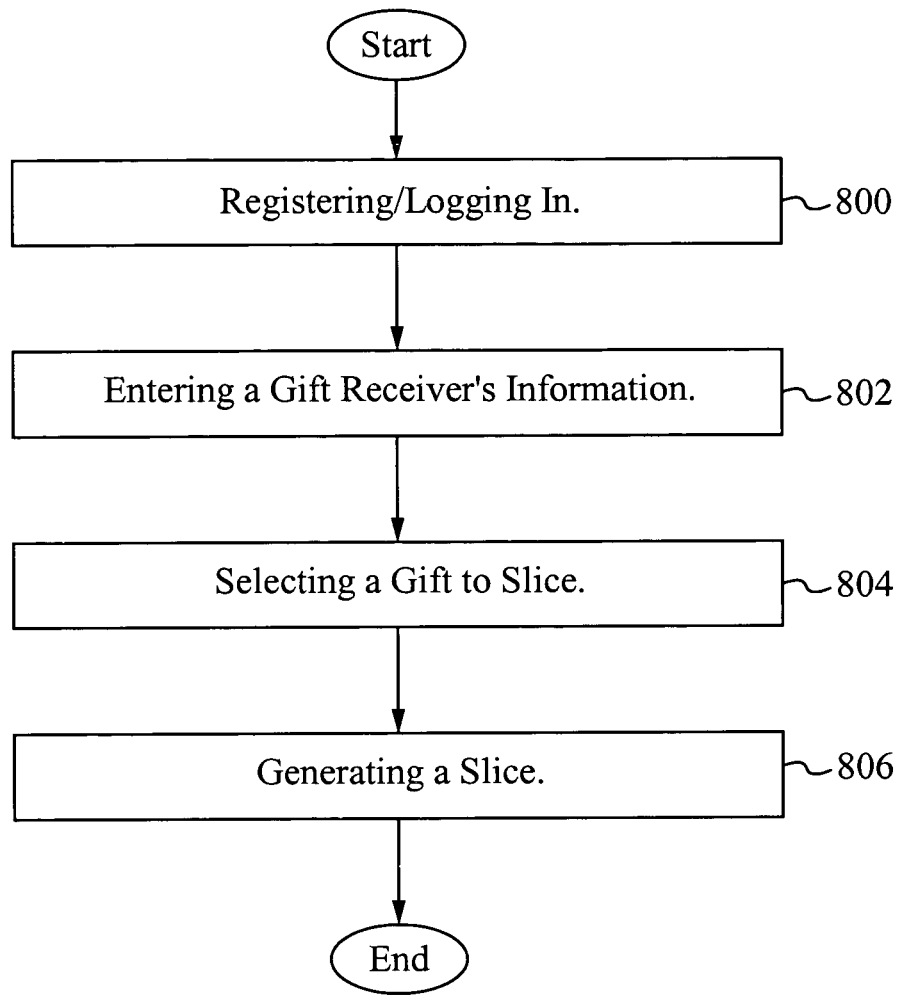
FIG. 8 illustrates a flowchart of a process of generating a sliced gift.

FIG. 8 illustrates a flowchart of a process of generating a sliced gift. In the step 800, the gift host registers or logs in if already registered. Registration includes providing personal information including the gift host's birthday. In some embodiments, the step 800 does not have to occur first and is able to occur later on. In some embodiments, the step 800 is able to be skipped because the user is already logged in or because registration is not required. In the step 802, gift receiver information is entered by a user, preferably the gift host. For example, the gift receiver's name and birthday are entered. Others are able to enter the gift receiver information. The position of the step 802 varies depending on the configuration of the website. If the website does not have an introductory page, then the step 802 is able to occur at a later time. In the step 804, a gift or gifts is/are selected. The gift is selected by navigating through web pages in a manner well known in the art for purchasing online items, where a computing device receives the gift selection. In some embodiments, navigating includes searching through gifts not only contained on the present website, but also other websites such as Amazon.com®. In some embodiments, the gift is selected using a wish list or suggested gifts as described herein. In the step 806, a slice is generated by inputting details related to the slice such as a minimum contribution, a number of days to contribute and whether a gift card will be purchased if not enough funds are received, amongst other items as described above. The gift host also inputs email addresses of individuals to invite to contribute to the gift. Preferably, generating the slice includes notifying invited contributors of the slice. Notification is preferably by email and is preferably automatically sent when the slice is generated.

Figure 9:
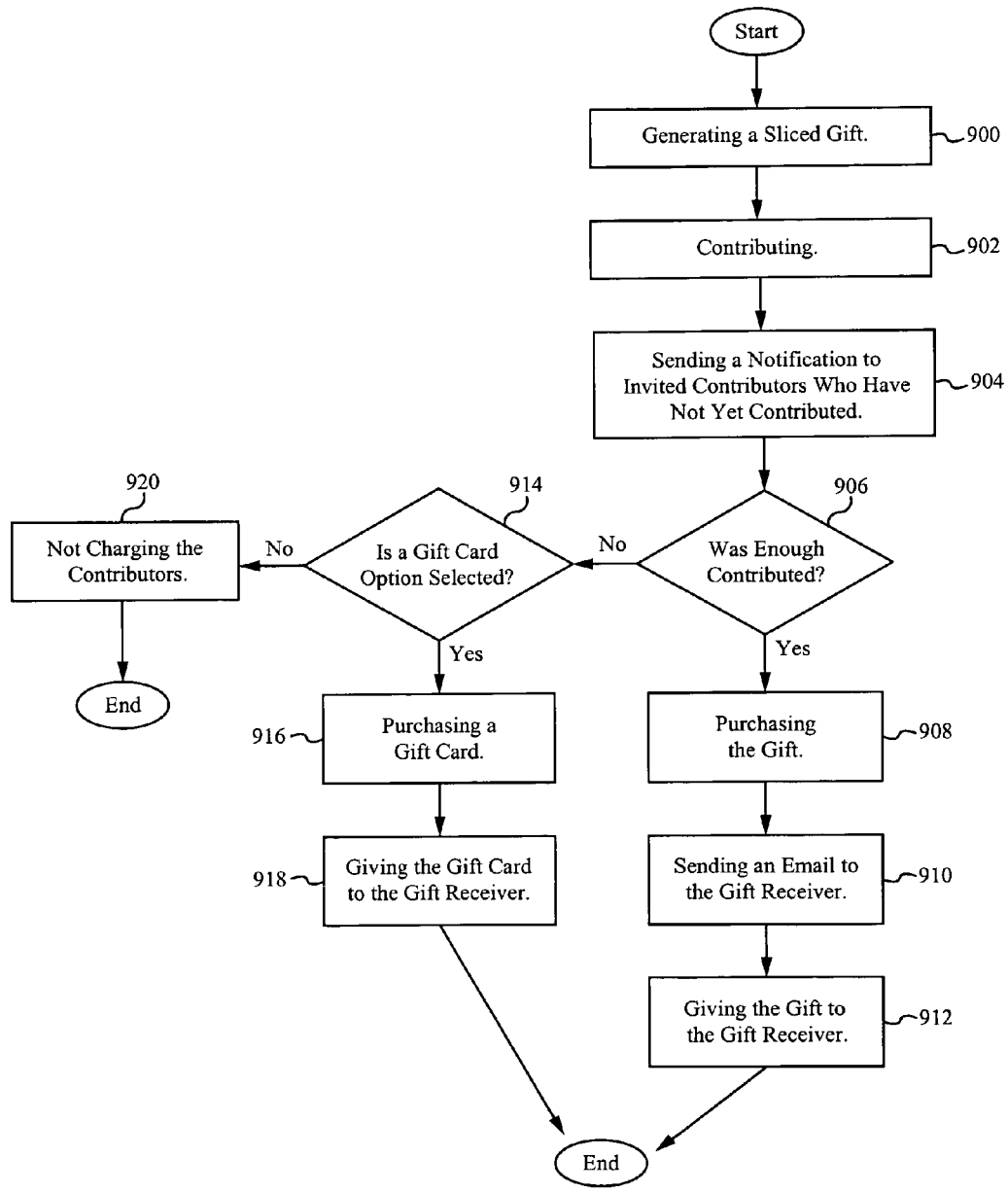
FIG. 9 illustrates a flowchart of a process of purchasing a gift with multiple contributors.

FIG. 9 illustrates a flowchart of a process of purchasing a gift with multiple contributors. At the step 900, a sliced gift is generated. Preferably, the step 900 includes the steps 800 through 806 as described above. At the step 902, invited contributors contribute towards the purchase of the sliced gift via a website. Preferably, the website includes a feature to receive contributions such as Google Checkout®. To contribute, the invited contributors preferably register or log in to the website. Registering includes supplying their name, birthday and possibly other information. In some embodiments, an email is sent to invited contributors who have not paid yet on the day or a few days before the deadline, to help prompt them to contribute, at the step 904. At the step 906, it is determined if enough money was contributed by the deadline to purchase the sliced gift. If enough money is contributed, then the gift purchase is executed and the gift is purchased at the step 908. At the step 910, an email is optionally sent to the gift receiver. The email preferably includes birthday wishes from the contributors. The purchased gift is then given to the gift receiver at the step 912.

Preferably, the gift is sent to the gift receiver from the e-tailer where the gift is purchased. In some embodiments, the gift is sent to one of the contributors, and then the gift is given to the gift receiver at, for example, a party. If not enough money was contributed, then it is determined if a gift card option was selected, at the step 914. If the gift card option was selected, then a gift card is purchased, at the step 916. The gift card is given to the gift receiver, at the step 918. Similar to the gift, the gift card is able to be mailed directly to the gift receiver or given to the gift receiver by a contributor. If the gift card option is not selected, then the contributors are not charged, at the step 920. In some embodiments; the contributors are given a refund. In some embodiments, the contributors are not charged until the contribution goal is reached, and therefore will not be charged if the contribution goal is not reached.

Figure 10:
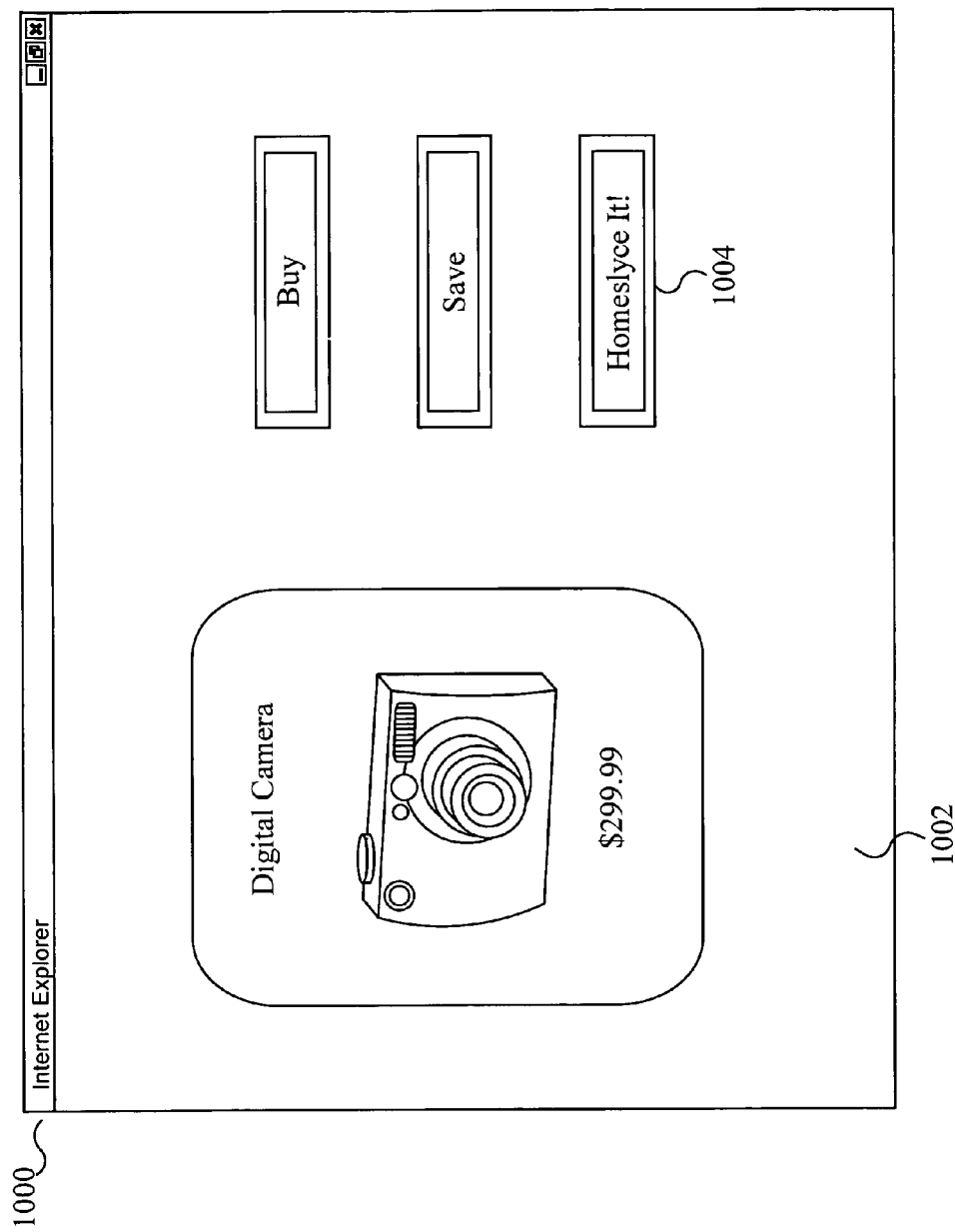
FIG. 10 illustrates a graphical representation of a browser containing an exemplary web page implementing a button to initiate a multiple contribution purchase.

FIG. 10 illustrates a graphical representation of a browser 1000 containing an exemplary web page 1002 implementing a button 1004 to initiate a multiple contribution purchase. The browser 1000 is able to be any Internet browser such as Internet Explorer®, Netscape® or Firefox® usable to display web pages. Preferably, the web page 1002 is from an e-commerce site or e-tailer where products are sold such as Amazon.com®, Buy.com® and Target.com®. The web page 1002 is also able to be from an auction site such as eBay.com®. The button 1004 is configured on any area of the web page 1002, so that the button 1004 is accessible when purchasing an item, for example, a digital camera. In some embodiments, instead of a button being used to initiate a multiple contribution purchase another implementation is utilized including, but not limited to a link, a checkbox, a radio button or a drop-down menu item. Upon clicking the button 1004, the user is directed to a website or web pages such as or similar to those described in FIGS. 1-7, where the user is able to input information related to gift slicing including gift receiver information, contributor information and any other information desired and/or necessary. In some embodiments, the web pages are integrated within the host site such as Amazon.com®. In some embodiments, the web page 1002 implementing the button 1004 resides on a different website than the website where the user is able to input information related to gift slicing.

Figure 11:
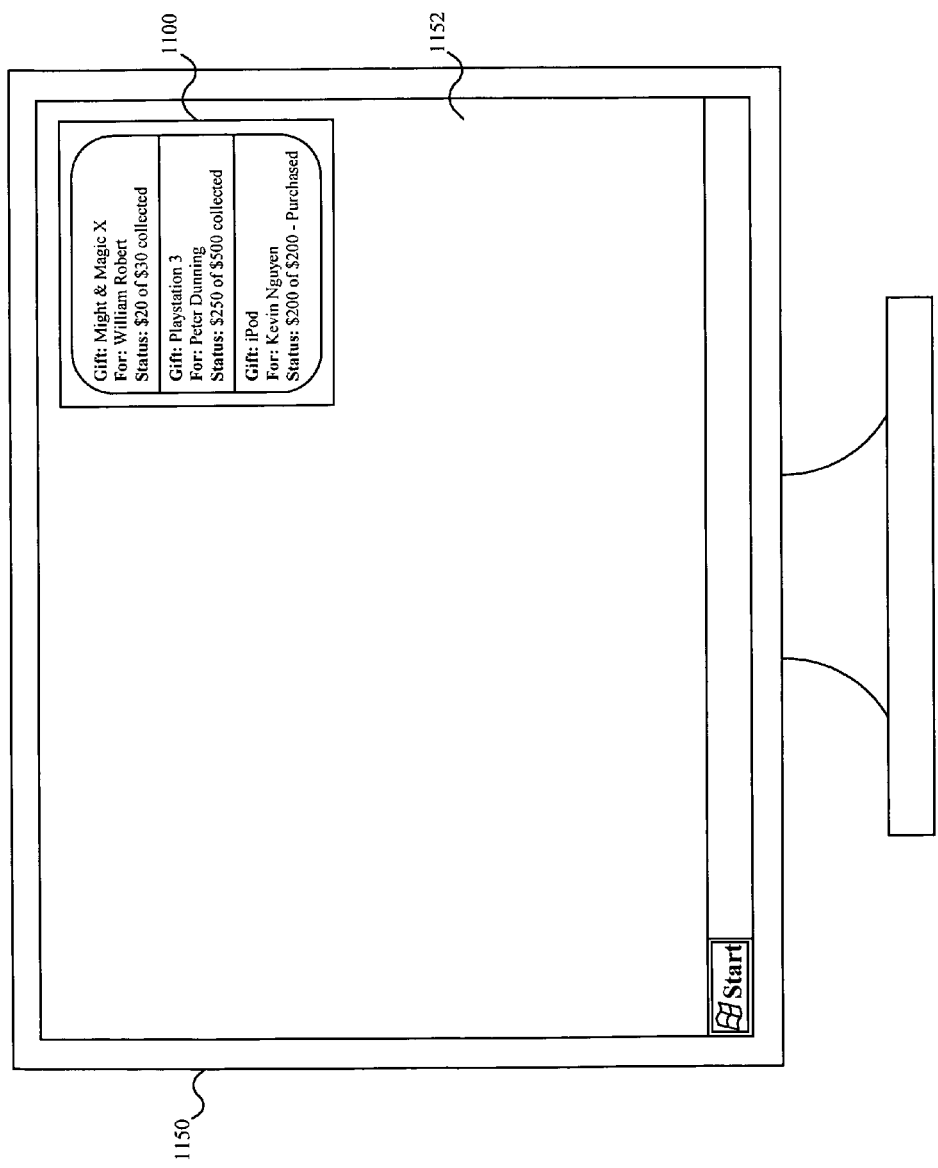
FIG. 11 illustrates a graphical representation of an exemplary desktop widget.

FIG. 11 illustrates a graphical representation of an exemplary desktop widget 1100. The desktop widget 1100 is an application which enables a user, preferably a contributor including the gift host, to keep track of the gift slices on a user's desktop without having to log onto a website. Preferably, the desktop widget 1100 has Really Simple Syndication (RSS)-feed functionality so that every time someone within a group makes a contribution, the RSS-feed notifies the other contributors involving that gift slice. Preferably, the desktop widget 1100 displays what the gift is, whom the gift is for and the status of the gift such as how much money has been collected/contributed. The desktop widget 1100 is able to display more information if desired such as names of the contributors. The desktop widget 1100 is also able to link to a web page, so that by clicking a section of the desktop widget 1100, the corresponding web page is displayed containing gift slice data related to that section of the desktop widget 1100. Preferably, the desktop widget 1100 is downloaded to a user's computer. The desktop 1100 widget is displayed on a user's monitor 1150 on the desktop 1152 of an operating system. Preferably, the desktop widget 1100 is sized so that it is able to be displayed at the same time other applications are displayed. For example, if a user is typing a term paper on a word processing application which takes up a majority of the screen, preferably, the desktop widget 1100 is still able to be visible. The desktop widget 1100 is preferably no more than ¼ of the size of the desktop 1152 and in some embodiments no more than ⅛ of the size of the desktop 1152.

Figure 12:
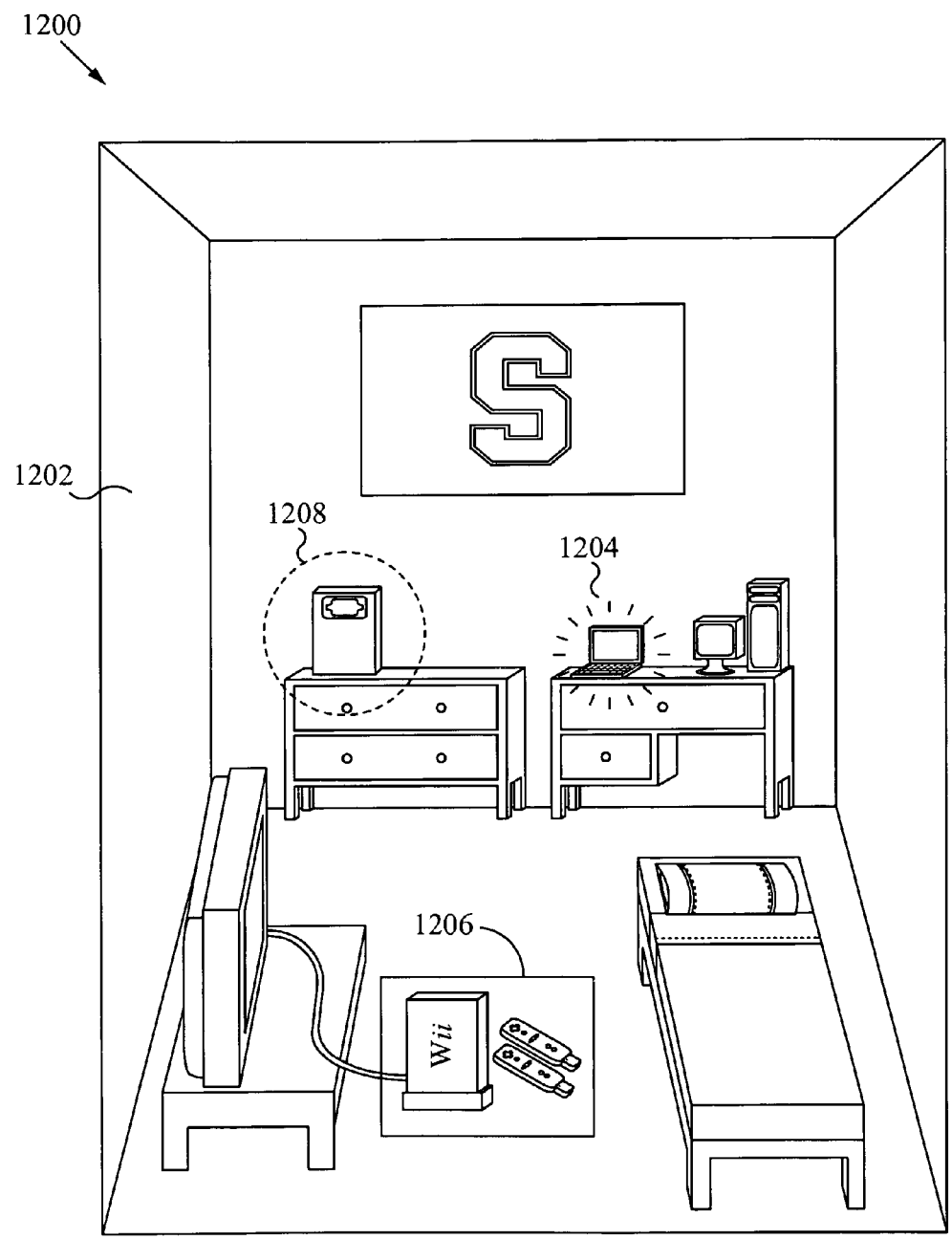
FIG. 12 illustrates a graphical representation of an exemplary virtual wish list.

FIG. 12 illustrates a graphical representation of an exemplary virtual wish list 1200. Instead of simply providing a list of desirable gifts, a user is able to select images of products and place them within another image, for example, an image of a dorm room. As shown in FIG. 12, a dorm room image 1202 is displayed. The user then places images of desired gifts within the dorm room image 1202. The desired gifts are able to be anything, such as a laptop 1204, a gaming system 1206 or a video game 1208. Preferably, the desired gift images stand out from the rest of the image, for example, the laptop 1204 has a glow effect around it, the gaming console 1206 has a box around it and the video game 1208 has another indicator around it. Any other indicators are possible so long as they distinguish the gifts from the already existing items in the room, such as highlighting, different coloration, scroll-over actions or a sound indicator. After the user sets up the virtual wish list 1200, gift givers are able to visit the virtual wish list and select items to purchase. Preferably, the virtual wish list 1200 is displayed on a web page. Preferably, each item contains a link to an e-tailer to purchase the item or each item is directly purchasable from the virtual wish list 1200. In some embodiments, scrolling over an item displays more information about the item such as price and specifications.

Figure 13:
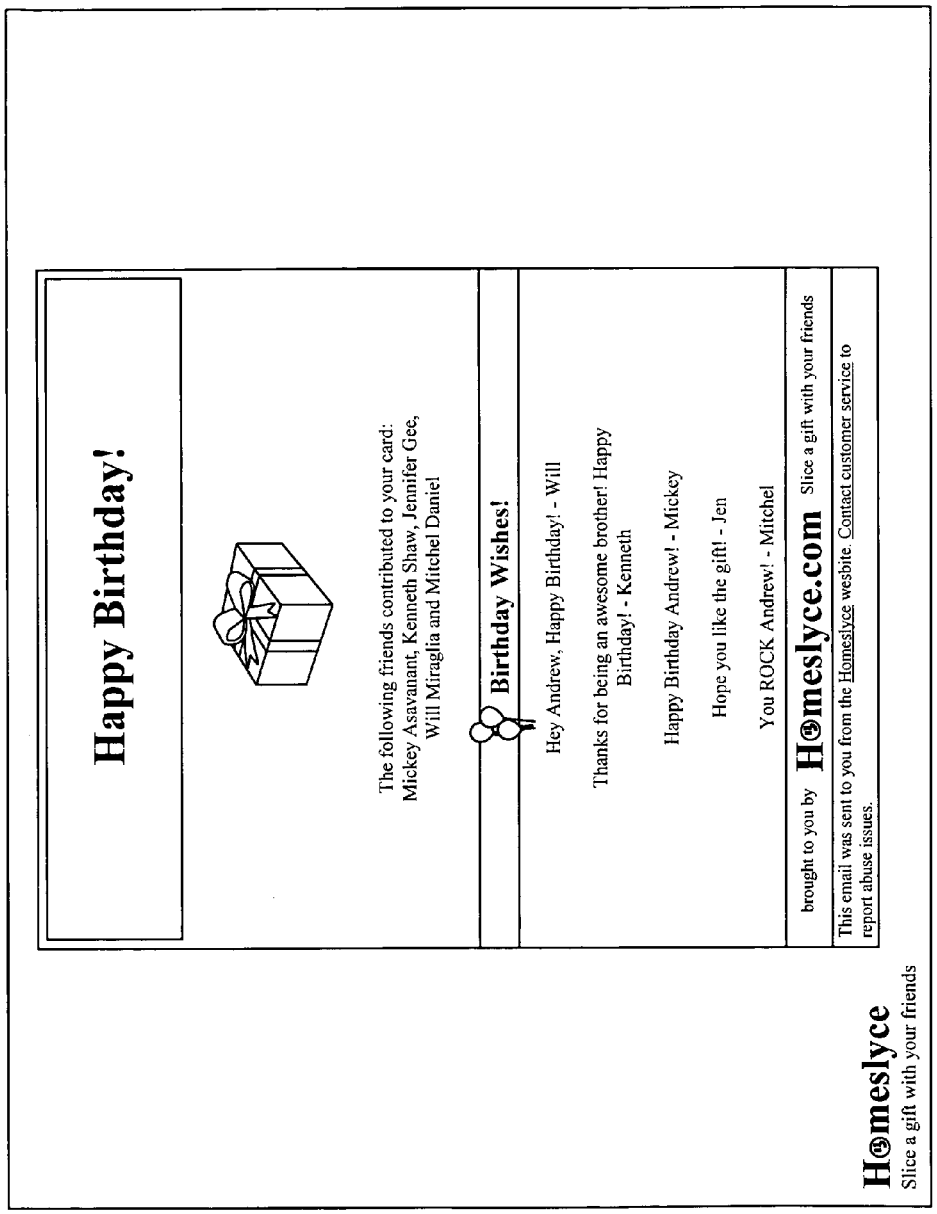
FIG. 13 illustrates a graphical representation of an exemplary collaborative electronic card (ecard).

FIG. 13 illustrates a graphical representation of an exemplary collaborative electronic card (ecard) 1300. In addition to or instead of slicing a gift, groups of people are able to send a collaborative ecard 1300. Each person within the invited group is able to write a message which will appear on the collaborative ecard 1300. Furthermore, people are able to select from various font styles, colors and sizes, as well as other abilities, possibly even drawing a picture or adding images or clipart. The collaborative ecard 1300 is sent to the designated recipient automatically after all of the invitees sign it, after a deadline passes or on a designated date. The recipient receives the collaborative ecard 1300 via email or receives a notification that the ecard 1300 is viewable on a web page. In some embodiments, the collaborative ecard is converted into a physical paper copy and mailed to the recipient.

Figure 14:
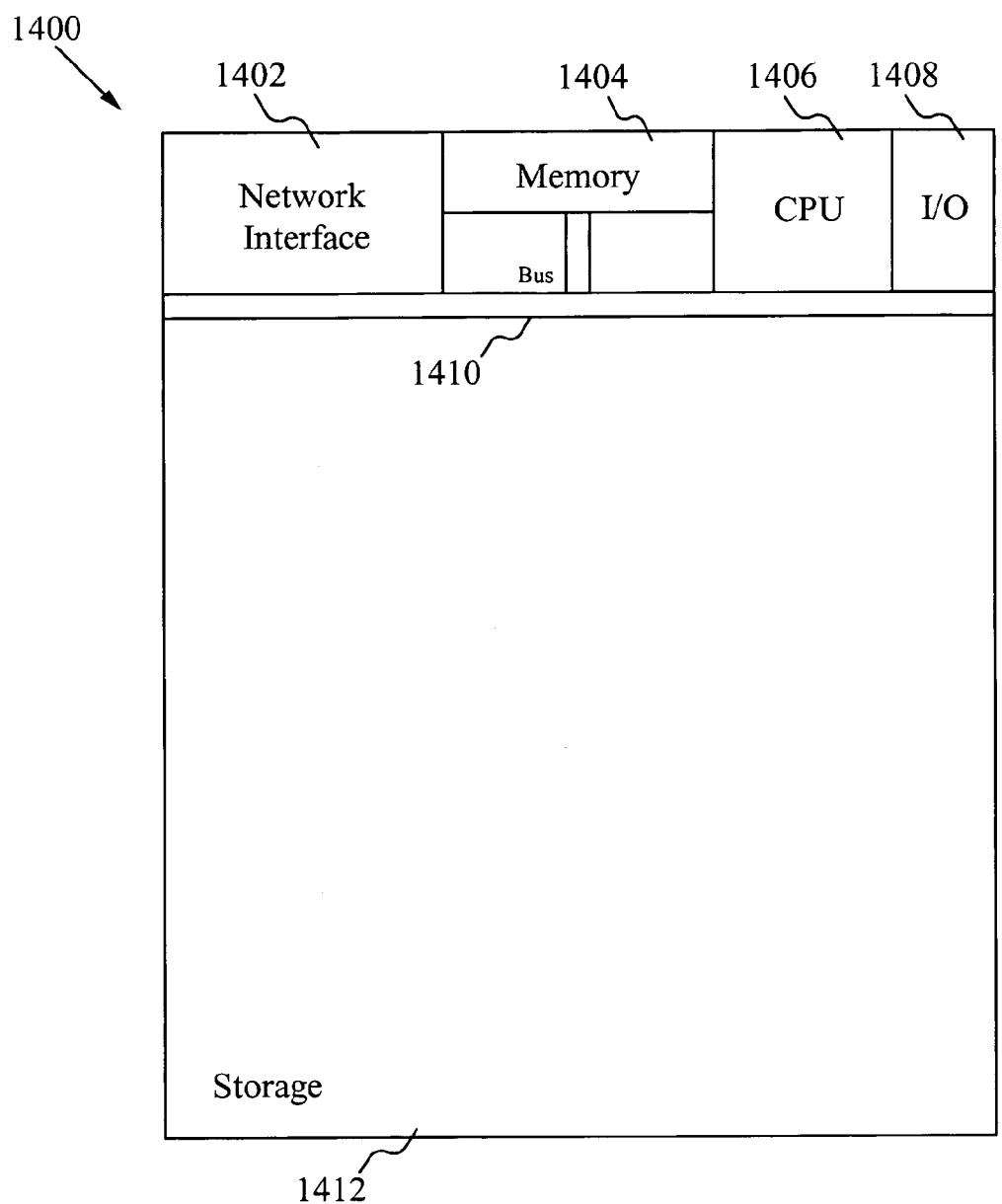
FIG. 14 illustrates a graphical representation of an exemplary computing device.

FIG. 14 illustrates a graphical representation of an exemplary computing device 1400. The computing device 1400 is able to be used to store, serve, compute, communicate and/or display information to enable multiple users to contribute to the purchase of an item, in addition to the many other tasks computing devices are capable of. For example, a computing device 1400 such as a server or a set of servers, hosts the website which stores and serves products to purchase, slice information and the other data related to purchasing a gift online by slicing. Continuing with the example, a different computing device such as a personal computer is used by the gift host and the other contributors to generate and configure the gift slice and contribute money. In general, a hardware structure suitable for implementing the computing device includes a network interface 1402, a memory 1404, processor 1406, I/O device(s) 1408, a bus 1410 and a storage device 1412. The choice of processor is not critical as long as a suitable processor with sufficient speed is chosen. The memory 1404 is able to be any conventional computer memory known in the art. The storage device 1412 is able to include a hard drive, CDROM, CDRW, DVD, DVDRW, flash memory card or any other storage device. The computing device is able to include one or more network interfaces 1402. An example of a network interface includes a network card connected to an Ethernet or other type of LAN. The I/O device(s) 1408 are able to include one or more of the following: keyboard, mouse, monitor, display, printer, modem and other devices. Software used to perform the methods of the present invention are likely to be stored in the storage device 1412 and memory 1404 and processed as applications are typically processed.

Examples of suitable computing devices include a personal computer, laptop computer, computer workstation, a server, mainframe computer, handheld computer, personal digital assistant, cellular/mobile telephone, smart appliance, gaming console or any other suitable computing device.

Figure 15:
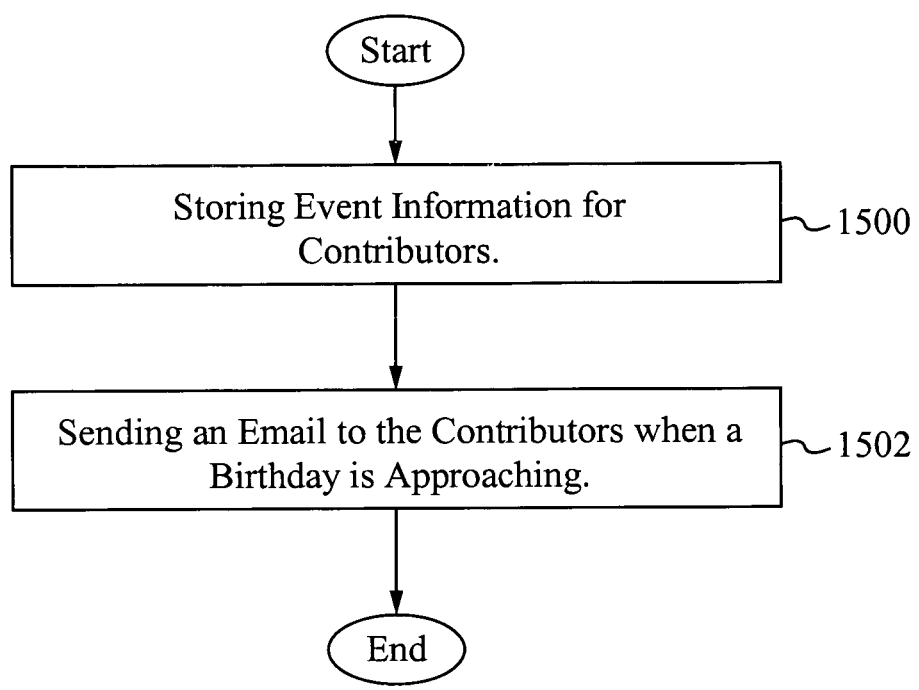
FIG. 15 illustrates a flowchart of a process of reminding contributors of other contributors' events.

As described above, each contributor supplies his/her birthday when contributing to the gift receiver's gift. FIG. 15 illustrates a flowchart of a process of reminding contributors of other contributors' events such as birthdays, anniversaries, holidays and other events. Preferably, the events happen at least once a year. Preferably, the website, or more specifically a database controlled by the website, retains event information such as birthday information for each contributor, in the step 1500. In the step 1502, the website sends an email related to an event to everyone involved in the gift slicing, including the gift host, the contributors and the gift receiver, so that when others' events arrive, the other people will be reminded, so that they can then get that person a present as well. The person whose event it is does not receive a reminder. For events such as holidays, all contributors receive a reminder so that everyone is able to get each other a Christmas gift, for example. The process continuously repeats so that everyone in the group is able to receive a sliced gift. The individuals involved in the gift slicing preferably have a relationship such that they are willing to give each other gifts such as family members, close friends or co-workers. For example, four college roommates, Al, Bob, Fred and Dave slice a birthday gift for their other roommate Mike. All have entered in their birthdays when registering, and then Dave's birthday comes around a month after Mike's. A time period such as a few days or weeks before Dave's birthday arrives, an email is sent out to Al, Bob, Fred and Mike reminding them of Dave's birthday. The reminder is able to include as much or as little data as desired. For example, the email is able to include simply "Dave's b-day 7/7." The email is also able to include additional information such as suggested gifts which are established using the schemes described above. In some embodiments, instead of an email, a voice message or text message is sent. This reminder will encourage users to continue slicing gifts for each other.

As described above, purchasing items with contributions from multiple people is not limited to birthdays. Items are able to be purchased with contributions from multiple people for weddings, graduations, anniversaries, holidays such as Christmas and other days when people give gifts.

The input components described herein are able to be selected from any one or a combination of standard or customized web page input components such as a text box, text area, command button, drop-down menu, menu, tab, check box, radio button, forms and any other input components.

In some embodiments, the input components used on the web pages, such as text boxes, command buttons and so on, throughout the website are configurably displayed. For example, if a gift host does not want contributors to be able to post personal messages, he is able to disable that component. Furthermore, with additional Graphical User Interface features, gift hosts are able to make highly customized pages and emails which contributors will interact with.

In some embodiments, once the gift is selected it is not able to be changed. In some embodiments, the gift host and/or the contributors is/are able to change the gift. In some embodiments, the gift is able to be changed a limited number of times. In some embodiments, the gift is only able to be switched for a lesser/similar/more expensive valued gift. In some embodiments, the gift is only able to be changed if there is complete agreement by all contributors including the gift host. In some embodiments, a majority of contributors are able to change the gift. In some embodiments, the gift is able to change after the deadline passes and the gift price has not been met, so that a slightly less expensive gift is able to be purchased instead of a gift card. In some embodiments, the gift is not selected first, but rather, the gift is selected after the deadline so that the total amount of contributions is known. Afterwards, either the gift host is able to select the gift, or a vote is able to be held with all contributors to select the gift. If there is left over money due to the gift costing less than the contributed amount, in some embodiments, the gift host receives the money. In some embodiments, the money is split based on contribution percentages and returned to the contributors. In some embodiments, based on the total charge of the gift, each contributor's amount is reduced according to their contribution percentage.

In some embodiments, a gift voting system is implemented. Instead of the gift host selecting the gift, the contributors including the gift host are able to select the gift by voting. Anyone, preferably, a contributor is able to suggest a gift. If only a single item is suggested, then that will be the selected gift. However, if multiple items are suggested, and the group is only purchasing one item, then the contributors vote on which gift to get. Any voting implementation on a web page is possible, and once a voting deadline passes, the item with the most votes is selected as the gift. Similarly, contributors are able to vote to purchase multiple items with additional questions implemented in the voting scheme such as, "how many gifts do you want to get for Bob?"

In an embodiment, a general money aggregation engine is usable to aggregate money from a group of people and transfer the money to one person such as in the person's bank account.

In some embodiments, an Application Programming Interface (API) enables local stores that want to list their products on the shopping page of the website to upload their product descriptions into a database accessible by the website. If the products are determined to be appropriate for the website, the products will be shown on the shopping page.

In some embodiments, data necessary to generate a slice is stored such as contributors' email addresses, so that one click is all that is required to slice a gift.

To utilize the method of and system for purchasing an item using contributions from multiple people, a gift host registers and establishes a gift contribution setup utilizing designated web pages. The web pages include the necessary interaction components to provide information and receive user input. The gift contribution setup includes selecting a gift or gifts, configuring requirements for contributing to the gift and inviting possible contributors. To make a contribution, the invited possible contributors preferably also register, indicate how much they are going to contribute and supply the necessary information to make the contribution via designated web pages. After a contribution goal is met and/or a deadline is passed, the gift is purchased and given to the gift receiver.

In operation, the method of and system for purchasing an item using contributions from multiple people provides a convenient way for a group of people, preferably close friends, family members or co-workers to purchase a gift or gifts for another person and split the cost. The people preferably have a close relationship so that they are able to continuously use the method and system to buy each other gifts and be reminded of contributing towards a special occasion of others in the group. For example, a group is able to be a group of close college friends whom each year buy each other birthday gifts. Another example of a group of contributors is a family including an immediate family and possibly close aunts and uncles where each year everyone buys each other birthday and Christmas gifts. The method of and system for purchasing an item using contributions from multiple people provides a convenient way for a group of people who may not be closely related to each other but closely related to the gift recipient to purchase a gift or gifts for the gift recipient and split the cost. For example, a group is able to be a group of friends, parents, and teachers who may not know each other but are close to the gift recipient and will willingly contribute towards the gift.

In some embodiments, a button or similar component is placed on an existing e-commerce website such as Amazon.com® which allows people to purchase the gift with multiple people instead of the standard single-person purchase. The button directs the person clicking/pressing the button to a website which enables configuration of the gift slicing contribution scheme. The gift host who selected the gift supplies information to the website including characteristics of the contributions such as minimum contribution, maximum contribution, deadline for contributing, who to invite to contribute and whether or not a gift card will be given if the contribution requirement is not met. After the gift host configures the gift slicing contribution scheme, an email is sent by an application to each of the invited contributors. The application sending the email is able to be any type of application such as a web-based application or a non-web-based application. The email preferably contains a link to the website to contribute where each of the invited contributors are able to contribute toward the gift. Preferably, each invited contributor registers/logs on and provides information such as their birthday to enable use of the method and system for their birthdays. While the contribution period is ongoing, the gift host and invited contributors are able to monitor the status of contributions by downloading a desktop widget or visiting a website which provides updates of contributions. After the gift contribution goal is met (e.g. the price of the gift) or after the deadline is passed, the gift is purchased if there are enough contributions. The gift is sent, either to the gift receiver or to someone else to deliver the gift to the gift receiver. When the gift contribution goal is not met, if a gift card option has been selected, the gift receiver will receive a gift card. If the gift card option is not met, then the contributors will not be charged or, if selected, a less expensive gift will be purchased. The gift host and contributors will be notified of the result, preferably through email.

In addition to purchasing a gift by navigating to an online e-tailer such as Amazon.com®, a gift host is able to go to the website which contains the configuration tools for the gift slicing contribution scheme and also has products from which to select. To help select a gift, in some embodiments, gifts are recommended based on data collected as described above. In some embodiments, gifts are selected based on products shown in a virtual wish list. In some embodiments, gifts are recommended using a system which browses through the gift receiver's profile on social networking sites.

In some embodiments, contributors other than the gift host are able to make modifications to the gift slice configuration. In some embodiments, elements of gift slices are pre-configured. In some embodiments, gift slices are able to be saved to be used in subsequent gift slices, such as a group labeled college roommates which includes only email addresses of the person's college roommates.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of enabling a plurality of users to contribute to a purchase of an item via computing devices connected to a contribution system, using a contribution system via a computing device to purchase an item, comprising:
   a. inputting, at a computing device, identification and delivery location information about an item receiver and a minimum contribution value from each user;
   b. providing a virtual item list wherein the virtual item list includes a first image with additional images of desired items, wherein the additional images are placed within the first image and each additional image includes a link to purchase the item;
   c. selecting one or more of the additional images of desired items and positioning the one or more additional images of desired items within the first image, wherein the additional images each include a glow effect with scrollover actions to distinguish the desired item from previously existing items in the first image;
   d. receiving an item selection indicating the selection of an item at the computing device;
   e. notifying the plurality of users of the item and the item receiver;
   f. receiving contribution data from each user's computing device associated with contributions towards the purchase of the item if the contribution data indicates a contribution value that is greater than or equal to the minimum contribution value;
   g. refraining from initiating a purchase and collecting the amount of money pledged until the contribution data indicates the contribution value is greater than or equal to the goal amount value; and
   h. executing the purchase of the item with the contribution data.

2. The method as claimed in claim 1 wherein the identification and delivery location information about the item receiver includes one or more of the item receiver's birthday information, physical address and email address.

3. The method as claimed in claim 2 further comprising delivering the item to the item receiver on a date based on the item receiver's birthday information.

4. The method as claimed in claim 2 further comprising delivering the item to the item receiver on a date based on a special occasion.

5. The method as claimed in claim 4 wherein the special occasion comprises one or more of a wedding, a graduation, an anniversary, and a holiday.

6. The method as claimed in claim 1 further comprising receiving contact information about the plurality of users who send the contributions towards the purchase of the item, wherein the contact information comprises data indicating one or more physical or virtual locations associated with one or more of the plurality of users.

7. The method as claimed in claim 6 wherein the contact information about the plurality of users is one or more email addresses of the plurality of users.

8. The method as claimed in claim 1 wherein receiving the item selection is without any input from an item receiver.

9. The method as claimed in claim 1 further comprising providing a list of recommended items wherein a searching component generates the list of recommended items.

10. The method as claimed in claim 9 wherein the list of recommended items is generated based on user profile data associated with the item receiver found on a website.

11. The method as claimed in claim 10 wherein the user profile data comprises data about the item receiver stored in the user profile.

12. The method as claimed in claim 1 further comprising a list of recommended items generated from data provided by at least one of the plurality of users.

13. The method as claimed in claim 1 further comprising a list of recommended items generated by an item receiver.

14. The method as claimed in claim 1 wherein a relationship is selected from the group consisting of family, friends and co-workers.

15. The method as claimed in claim 1 wherein the computing device is selected from the group consisting of a personal computer, a laptop computer, a computer workstation, a server, a mainframe computer, a handheld computer, a personal digital assistant, a cellular/mobile telephone, a smart appliance and a gaming console.

16. A method of enabling a plurality of users to collectively purchase an item using a system located on a computing device, comprising:
   a. providing a virtual item list wherein the virtual item list includes a first image with additional images of desired items, wherein the additional images each include a link to purchase the item;
   b. selecting one or more of the additional images of desired items and positioning the one or more additional images of desired items within the first image, wherein the additional images each include a glow effect with scrollover actions to distinguish the desired item from previously existing items in the first image;
   c. receiving an item selection indicating the selection of an item at the computing device, wherein the item selection is from the one or more additional images of desired items;
   d. receiving contribution data associated with an amount of money pledged by the plurality of persons at the computing device;
   e. computing and displaying a set of progress information based on the contribution data received, wherein the progress information includes a goal amount and time remaining;
   f. automatically refraining from initiating a purchase using the contribution data if the amount of money pledged from the plurality of persons does not equal or exceed the cost within a predetermined time period;
   g. executing the purchase of the item with the contribution data; and
   h. sending the item to the item receiver.

* * * * *